(12) United States Patent
Uchiyama (10) Patent No.: US 10,642,140 B2
(45) Date of Patent: May 5, 2020

(54) ILLUMINATION DEVICE AND PROJECTOR

(71) Applicant: SEIKO EPSON CORPORATION, Tokyo (JP)

(72) Inventor: Shoichi Uchiyama, Suwa-gun Shimosuwa-machi (JP)

(73) Assignee: SEIKO EPSON CORPORATION, Tokyo (JP)

( * ) Notice: Subject to any disclaimer, the term of this patent is extended or adjusted under 35 U.S.C. 154(b) by 0 days.

(21) Appl. No.: 16/448,075

(22) Filed: Jun. 21, 2019

(65) Prior Publication Data

US 2019/0391475 A1    Dec. 26, 2019

(30) Foreign Application Priority Data

Jun. 22, 2018    (JP) .................................. 2018-119078

(51) Int. Cl.
*G03B 21/20*    (2006.01)
*G02B 27/28*    (2006.01)

(52) U.S. Cl.
CPC ......... *G03B 21/204* (2013.01); *G02B 27/283* (2013.01); *G03B 21/20* (2013.01); *G03B 21/208* (2013.01); *G03B 21/2066* (2013.01); *G03B 21/2073* (2013.01)

(58) Field of Classification Search
CPC .. G03B 21/204; G03B 21/20; G03B 21/2066; G03B 21/2073; G03B 21/208; G02B 27/283

USPC .......................................................... 353/84
See application file for complete search history.

(56) References Cited

U.S. PATENT DOCUMENTS

2016/0353069 A1    12/2016    Chikahisa
2018/0157050 A1*    6/2018    Liao ..................... H04N 9/3129

FOREIGN PATENT DOCUMENTS

JP    2012-128340 A    7/2012
JP    2016-224304 A    12/2016

* cited by examiner

*Primary Examiner* — Steven Whitesell Gordon
*Assistant Examiner* — Jerry L Brooks
(74) *Attorney, Agent, or Firm* — Oliff PLC (57) ABSTRACT

An illumination device includes a blue laser emitting element, a red laser emitting element, a diffusely reflecting element configured to diffuse and reflect a part of light from the blue laser emitting element, a phosphor, a bandpass filter provided to the phosphor to transmit light from the red laser emitting element, a polarization splitting/combining element having a polarization split function, and a first wave plate disposed between the polarization splitting/combining element and the diffusely reflecting element. The polarization splitting/combining element guides a blue first polarization component to the diffusely reflecting element and guides a blue second polarization component to the phosphor. Then, the polarization splitting/combining element combines the fluorescence, the light from the red laser emitting element entering a second surface of the phosphor and then emitted from a first surface, and blue diffused light with each other to generate illumination light.

20 Claims, 4 Drawing Sheets

ILLUMINATION DEVICE AND PROJECTOR

The present application is based on, and claims priority from JP Application Serial Number 2018-119078, filed Jun. 22, 2018, the disclosure of which is hereby incorporated by reference herein in its entirety.

BACKGROUND

1. Technical Field

The present disclosure relates to an illumination device and a projector.

2. Related Art

In recent years, there is a technology of generating illumination light by combining a blue laser beam and fluorescence generated by excitation with the blue laser beam with each other as a light source device used for a projector. For example, in JP-A-2016-224304, there is disclosed a light source device which combines yellow fluorescence, a blue laser beam and a red laser beam with each other and then emits the result.

In the illumination device described above, the fluorescence is transmitted through a combining mirror and the red laser beam is reflected by the combining mirror, and thus the two light beams are emitted in the same direction to thereby generate illumination light.

Here, when, for example, increasing the transmittance of the combining mirror for the red component included in the fluorescence, the red laser beam transmitted through the combining mirror increases, and thus, the light loss caused in the red laser beam increases. In contrast, when, for example, increasing the reflectance of the combining mirror for the red laser beam, an amount of the red component included in the fluorescence and reflected by the combining mirror increases, and thus, the light loss caused in the fluorescence increases. As described above, in the illumination device described above, the loss always occurs in either of the red component of the fluorescence and the red laser beam.

SUMMARY

An illumination device according to an aspect of the present disclosure includes a blue laser emitting element, a red laser emitting element configured to emit light in a predetermined wavelength band, a diffusely reflecting element configured to diffuse and reflect a part of light from the blue laser emitting element, a phosphor excited by a part of the light from the blue laser emitting element to emit fluorescence, a bandpass filter provided to a second surface of the phosphor opposite to a first surface of the phosphor which the light from the blue laser emitting element enters, and configured to transmit the light from the red laser emitting element, a polarization splitting/combining element having a polarization split function with respect to the light from the blue laser emitting element, and a first wave plate disposed between the polarization splitting/combining element and the diffusely reflecting element, wherein the polarization splitting/combining element guides a blue first polarization component obtained by performing polarization split on the light from the blue laser emitting element to the diffusely reflecting element, and guides a blue second polarization component obtained by performing polarization split on the light from the blue laser emitting element to the phosphor, and combines the fluorescence emitted from the phosphor, the light from the red laser emitting element entering the second surface of the phosphor and then emitted from the first surface of the phosphor, and blue diffused light which is the blue first polarization component converted via the diffusely reflecting element and the first wave plate into a different polarization state with each other to generate illumination light.

In the illumination device according to the aspect described above, the bandpass filter may have a first diffusion layer disposed at a plane-of-incidence side which the light from the red laser emitting element enters.

An illumination device according to another aspect of the present disclosure includes a blue laser emitting element, a red laser emitting element configured to emit light in a predetermined wavelength band, a diffusely reflecting element configured to diffuse and reflect a part of light from the blue laser emitting element, a phosphor excited by a part of the light from the blue laser emitting element to emit fluorescence, a reflecting film provided to a second surface of the phosphor opposite to a first surface of the phosphor which the light from the blue laser emitting element enters, and having an opening configured to transmit the light from the red laser emitting element, a polarization splitting/combining element having a polarization split function with respect to the light from the blue laser emitting element, and a first wave plate disposed between the polarization splitting/combining element and the diffusely reflecting element, wherein the polarization splitting/combining element guides a blue first polarization component obtained by performing polarization split on the light from the blue laser emitting element to the diffusely reflecting element, and guides a blue second polarization component obtained by performing polarization split on the light from the blue laser emitting element to the phosphor, and combines the fluorescence emitted from the phosphor, red diffused light which is the light from the red laser emitting element entering the second surface of the phosphor via the opening and then emitted from the first surface of the phosphor to thereby be diffused, and blue diffused light which is the blue first polarization component converted via the diffusely reflecting element and the first wave plate into a different polarization state with each other to generate illumination light.

The illumination device according to the aspect described above may further include a second diffusion layer disposed in the opening of the reflecting film.

The illumination device according to the aspect described above may further include a pickup optical system disposed between the diffusely reflecting element and the polarization splitting/combining element, and a light collection optical system disposed between the red laser emitting element and the phosphor, wherein the pickup optical system and the light collection optical system may have the same lens configuration.

In the illumination device according to the aspect described above, the phosphor may diffuse the light from the red laser emitting element.

The illumination device according to the aspect described above may further include a second wave plate rotatably disposed between the polarization splitting/combining element and the blue laser emitting element.

A projector according to another aspect of the present disclosure includes the illumination device according to the aspect described above, a light modulation device configured to modulate the light from the illumination device in accordance with image information to thereby form image light, and a projection optical system configured to project the image light.

DESCRIPTION OF EXEMPLARY EMBODIMENTS

Hereinafter, some embodiments of the present disclosure will be described using the drawings.

First Embodiment

Figure 1:
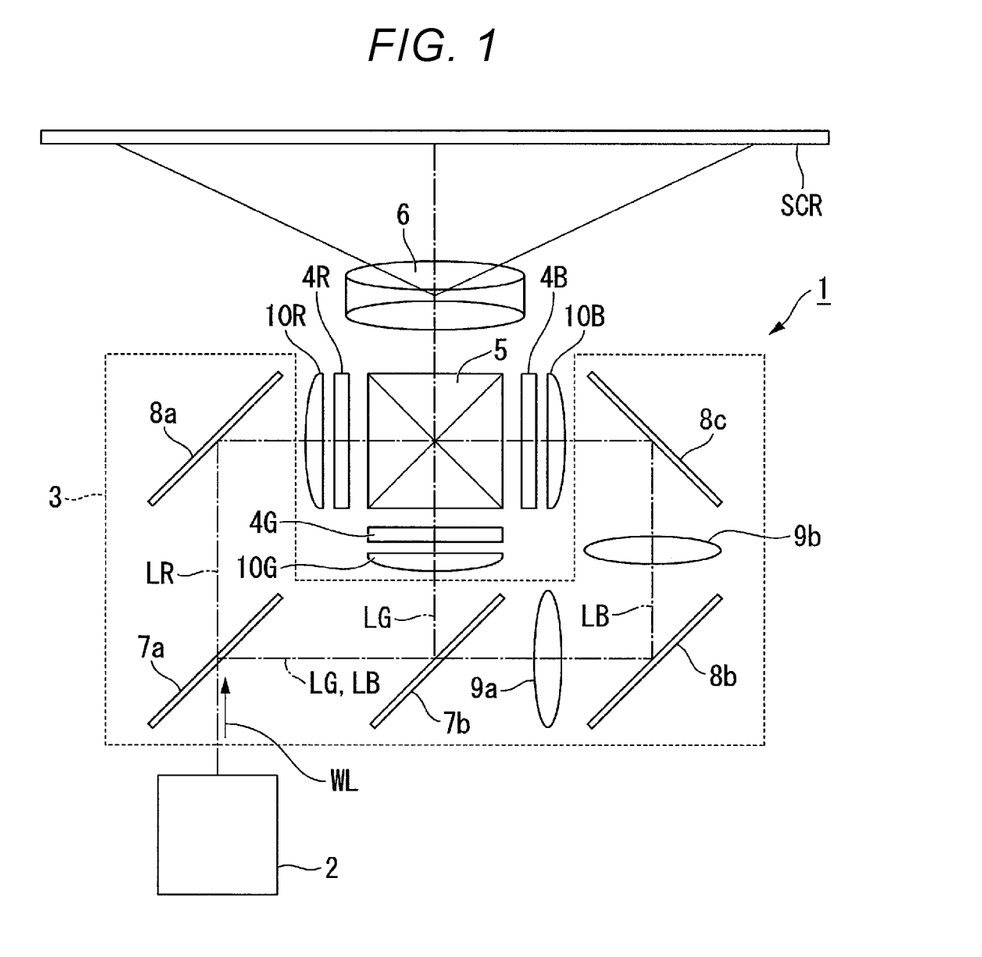
FIG. 1 is a schematic configuration diagram of a projector according to an embodiment.

FIG. 1 is a schematic configuration diagram of a projector according to the present embodiment.

As shown in FIG. 1, the projector 1 according to the present embodiment is a projection-type image display device for displaying a color image on a screen SCR. The projector 1 is provided with an illumination device 2, a color separation optical system 3, a light modulation device 4R, a light modulation device 4G, a light modulation device 4B, a combining optical system 5, and a projection optical system 6.

The illumination device 2 according to the present embodiment emits white illumination light WL toward the color separation optical system 3. The color separation optical system 3 separates the illumination light WL from the illumination device 2 into red light LR (e.g., light in a wavelength band of 600 nm through 700 nm), green light LG (e.g., light in a wavelength band of 500 nm through 600 nm), and blue light LB (e.g., light in a wavelength band of 440 nm through 470 nm).

The color separation optical system 3 is generally provided with a first dichroic mirror 7a and a second dichroic mirror 7b, a first total reflection mirror 8a, a second total reflection mirror 8b and a third total reflection mirror 8c, and a first relay lens 9a and a second relay lens 9b.

The first dichroic mirror 7a separates the illumination light WL from the illumination device 2 into the red light LR and the other light (the green light LG and the blue light LB). The first dichroic mirror 7a transmits the red light LR thus separated from, and at the same time reflects the rest of the light (the green light LG and the blue light LB). Meanwhile, the second dichroic mirror 7b reflects the green light LG and at the same time transmits the blue light LB to thereby separate the rest of the light into the green light LG and the blue light LB.

The first total reflection mirror 8a is disposed in the light path of the red light LR, and reflects the red light LR, which has been transmitted through the first dichroic mirror 7a, toward the light modulation device 4R. Meanwhile, the second total reflection mirror 8b and the third total reflection mirror 8c are disposed in the light path of the blue light LB to guide the blue light LB, which has been transmitted through the second dichroic mirror 7b, to the light modulation device 4B. The green light LG is reflected by the second dichroic mirror 7b toward the light modulation device 4G.

The first relay lens 9a is disposed between the second dichroic mirror 7b and the second total reflection mirror 8b in the light path of the blue light LB. The second relay lens 9b is disposed between the second total reflection mirror 8b and the third total reflection mirror 8c in the light path of the blue light LB.

The light modulation device 4R modulates the red light LR in accordance with image information to form image light corresponding to the red light LR. The light modulation device 4G modulates the green light LG in accordance with the image information to form image light corresponding to the green light LG. The light modulation device 4B modulates the blue light LB in accordance with the image information to form image light corresponding to the blue light LB.

As the light modulation device 4R, the light modulation device 4G, and the light modulation device 4B, there are used, for example, transmissive liquid crystal panels. Further, on the incident side and the exit side of each of the liquid crystal panels, there are respectively disposed polarization plates (not shown). Hereinafter, the light modulation device 4R, the light modulation device 4G and the light modulation device 4B are simply referred to as the light modulation devices 4R, 4G and 4B.

Further, on the incident side of the light modulation devices 4R, 4G and 4B, there are respectively disposed a field lens 10R, a field lens 10G and a field lens 10B. The field lens 10R, the field lens 10G and the field lens 10B respectively make the red light LR, the green light LG and the blue light LB entering the respective light modulation devices 4R, 4G and 4B telecentric.

The image light from each of the light modulation devices 4R, 4G and 4B enters the combining optical system 5. The combining optical system 5 combines the image light corresponding to the red light LR, the image light corresponding to the green light LG, and the image light corresponding to the blue light LB with each other, and then emits the image light thus combined toward the projection optical system 6. As the combining optical system 5, there is used, for example, a cross dichroic prism.

The projection optical system 6 is constituted by a projection lens group, and projects the image light combined by the combining optical system 5 toward the screen SCR in an enlarged manner. Thus, the color image enlarged is displayed on the screen SCR.

Illumination Device

Figure 2:
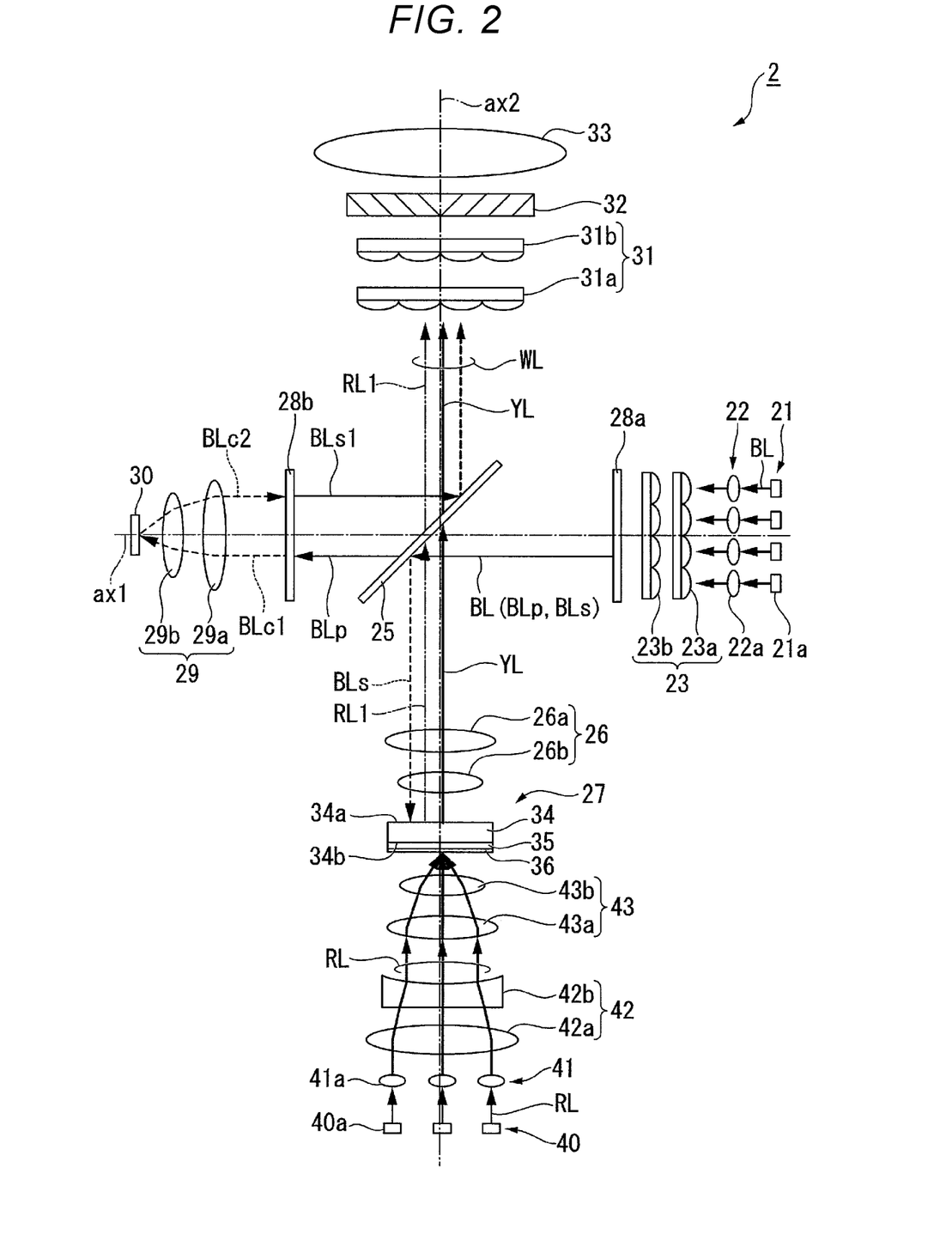
FIG. 2 is a diagram showing a schematic configuration of an illumination device.

Then, the illumination device 2 will be described. FIG. 2 is a diagram showing a schematic configuration of the illumination device. As shown in FIG. 2, the illumination device 2 is provided with a blue array light source 21, a first collimator optical system 22, a homogenizer optical system 23, a second wave plate 28a, a polarization beam splitter (a polarization splitting/combining element) 25, a first pickup optical system (a pickup optical system) 29, a first wave plate 28b, a diffusely reflecting element 30, a second pickup optical system 26, a fluorescence emitting element 27, a red supplementary light source 40, a second collimator optical system 41, an afocal optical system 42, a light collection optical system 43, a fly-eye integrator 31, a polarization conversion element 32 and a superimposing lens 33.

The blue array light source 21, the first collimator optical system 22, the homogenizer optical system 23, the second wave plate 28a, the polarization beam splitter 25, the first wave plate 28b, the first pickup optical system 29 and the diffusely reflecting element 30 are arranged in series on a light axis ax1 of the blue array light source 21.

Further, the red supplementary light source 40, the second collimator optical system 41, the afocal optical system 42, the light collection optical system 43, the fluorescence emitting element 27, the second pickup optical system 26, the polarization beam splitter 25, the fly-eye integrator 31, the polarization conversion element 32 and the superimposing lens 33 are arranged in series on an illumination light axis ax2. The light axis ax1 and the illumination light axis ax2 are located in the same plane, and are perpendicular to each other.

The blue array light source 21 is provided with a plurality of blue laser emitting elements 21a. The plurality of blue laser emitting elements 21a is arranged in an array in a plane perpendicular to the light axis ax1. The blue laser emitting elements 21a each emit, for example, a blue light beam BL (e.g., a blue laser beam in a wavelength band of 440 nm through 470 nm).

The light beams BL emitted from the blue array light source 21 enter the first collimator optical system 22. The first collimator optical system 22 converts the light beams BL emitted from the blue array light source 21 into parallel light. The collimator optical system 22 is constituted by, for example, a plurality of collimator lenses 22a arranged in an array. The collimator lenses 22a are disposed so as to correspond respectively to the blue laser emitting elements 21a.

The light beams BL having passed through the first collimator optical system 22 enter the homogenizer optical system 23. The homogenizer optical system 23 includes multi-lenses 23a, 23b. The homogenizer optical system 23 homogenizes the illuminance distribution in an area to be illuminated (a phosphor 34) in cooperation with the second pickup optical system 26. Further, the homogenizer optical system 23 homogenizes the illuminance distribution in an area to be illuminated (the diffusely reflecting element 30) in cooperation with the first pickup optical system 29.

The light beams BL having been transmitted through the homogenizer optical system 23 enter the second wave plate 28a. The second wave plate 28a is, for example, a half-wave plate disposed rotatably. The light beams BL emitted from the blue laser emitting elements 21a are each linearly polarized light. By appropriately setting the rotational angle of the second wave plate 28a, light beams including S-polarized light and P-polarized light with respect to the polarization splitter 25 described later at a predetermined ratio can be obtained as the light beams BL transmitted through the second wave plate 28a. By rotating the second wave plate 28a, the ratio between the S-polarized light and the P-polarized light can be changed.

The light beams BL, which are generated by passing through the second wave plate 28a, and include the S-polarized light and the P-polarized light, enter the polarization beam splitter 25. The polarization beam splitter 25 is disposed so as to form an angle of 45° with the light axis ax1 and the illumination light axis ax2.

Incidentally, the illumination device 2 according to the present embodiment is arranged to supplement the red component (the red light LR) of the illumination light WL with the light emitted from the red supplementary light source 40. Thus, it becomes possible to display the white light having an optimum white balance by supplementing the red component of the display image in the projector 1. The red supplementary light source 40 has a plurality of red laser emitting elements 40a. It should be noted that the number of the red laser emitting elements 40a is not particularly limited.

In the present embodiment, the red laser emitting elements 40a each emit a red supplementary light beam RL as light in the predetermined wavelength band. Specifically, the red supplementary light beam RL is a laser beam having a peak wavelength in a range of, for example, 635 through 645 nm.

Figure 3:
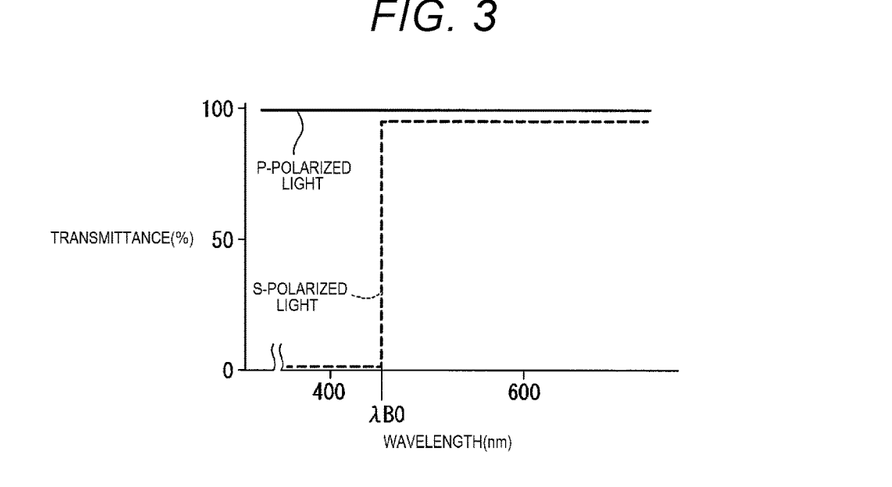
FIG. 3 is a diagram showing a spectral transmittance characteristic of a polarization beam splitter.

FIG. 3 is a diagram showing a spectral transmittance characteristic of the polarization beam splitter. In FIG. 3, the vertical axis corresponds to the transmittance of the polarization beam splitter, and the horizontal axis corresponds to the wavelength of the light entering the polarization beam splitter. Further, in FIG. 3, the transmittance characteristic in the P-polarized light is represented by the solid line, and the transmittance characteristic in the S-polarized light is represented by the dotted line. It should be noted that in FIG. 3, the wavelength $\lambda B0$ is a wavelength longer than the wavelength of the light beam BL and shorter than the shortest wavelength of the band of the fluorescence YL.

As shown in FIG. 3, in the polarization beam splitter 25, the transmittance for the P-polarized light is as high as no lower than 90% throughout the entire visible range. In the polarization beam splitter 25, the transmittance for the S-polarized light is zero or nearly zero in a short wavelength band not higher than $\lambda B0$.

In the present embodiment, the polarization beam splitter 25 has a polarization split function of splitting the light beams BL from the blue laser emitting elements 21a into the light beams BLs (a blue second polarization component) as S-polarized light with respect to the polarization beam splitter 25, and the light beams BLp (a blue first polarization component) as P-polarized light. Thus, the light beams BLp as the P-polarized light are transmitted through the polarization beam splitter 25, and then proceed toward the diffusely reflecting element 30, and the light beams BLs as the S-polarized light are reflected by the polarization beam splitter, and then proceed toward the fluorescence emitting element 27.

The light beams BLp as the P-polarized light transmitted through the polarization beam splitter 25 to proceed toward the diffusely reflecting element 30 enter the first wave plate 28b. The first wave plate 28b is formed of a quarter-wave plate disposed in the light path between the polarization beam splitter 25 and the diffusely reflecting element 30. The first wave plate 28b is set so as to provide a phase difference of a quarter wavelength to the light beams BL from the blue laser emitting elements 21a.

Therefore, the light beam BLp as the P-polarized light is converted by the first wave plate 28b into, for example, a blue light beam BLc1 as clockwise circularly polarized light, and then enters the first pickup optical system 29. The first pickup optical system 29 is formed of, for example, two lenses 29a, 29b. The blue light beams BLc1 via the homogenizer optical system 23 and the first pickup optical system 29 enter the diffusely reflecting element 30 in the state in which the illuminance distribution is homogenized.

The diffusely reflecting element 30 is disposed at the opposite side to the phosphor 34 in the polarization beam splitter 25, and diffusely reflects the blue light beams BLc1, which have been emitted from the first pickup optical system 29, toward the polarization beam splitter 25.

According to the present embodiment, by diffusely reflecting the blue light beams BLc1, there can be obtained the blue diffused light BLc2 having a roughly homogenous illuminance distribution. For example, the blue light beams BLc1 as the clockwise circularly polarized light are reflected as the blue diffused light BLc2 as counterclockwise circularly polarized light. The blue diffused light BLc2 is converted by the first pickup optical system 29 into parallel light, and then enters the first wave plate 28b once again.

The blue diffused light BLc2 as the counterclockwise circularly polarized light is converted by the first wave plate 28b into blue diffused light BLs1 as S-polarized light. The blue diffused light BLs1 as the S-polarized light is reflected by the polarization beam splitter 25 toward the fly-eye integrator 31.

Meanwhile, the light beams BLs as the S-polarized light having been reflected by the polarization beam splitter 25 enter the second pickup optical system 26. The second pickup optical system 26 converges the light beams BLs toward the phosphor 34.

In the present embodiment, the second pickup optical system 26 is formed of, for example, lenses 26a, 26b. The light beams BLs via the homogenizer optical system 23 and the second pickup optical system 26 enter the area to be illuminated of the fluorescence emitting element 27 in the state in which the illuminance distribution is homogenized. The fluorescence emitting element 27 has the phosphor 34 and a bandpass filter 35.

The phosphor 34 absorbs the light beams BLs to be excited. The phosphor excited by the light beams BLs emits the yellow fluorescence YL in the wavelength band of, for example, 500 through 700 nm. The phosphor 34 of the present embodiment is configured by, for example, dispersing phosphor particles and scattering substances in a binder. It should be noted that on a side surface of the phosphor 34, there is disposed a reflecting film (not shown) for reflecting the fluorescence YL.

The bandpass filter 35 is disposed on a lower surface (a second surface) 34b opposite to an upper surface (a first surface) 34a which the light beams BLs enter in the phosphor 34. The bandpass filter 35 has an optical characteristic of transmitting the red supplementary light beams RL emitted from the red laser emitting elements 40a.

Figure 4:
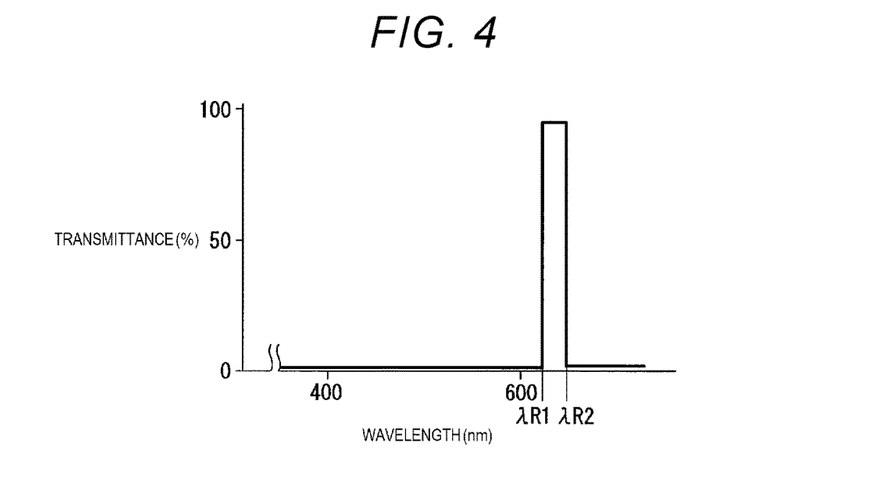
FIG. 4 is a diagram showing a spectral transmittance characteristic of a bandpass filter.

FIG. 4 is a diagram showing a spectral transmittance characteristic of the bandpass filter. In FIG. 4, the vertical axis corresponds to the transmittance of the bandpass filter, and the horizontal axis corresponds to the wavelength of the light entering the bandpass filter. In FIG. 4, the wavelength λR1 is equivalent to or slightly shorter than the shortest wavelength of the predetermined wavelength band of the red supplementary light beam RL, and the wavelength λR2 is equivalent to or slightly longer than the longest wavelength of the predetermined wavelength band of the red supplementary light beam RL. It should be noted that the band between the wavelength λR1 and the wavelength λR2 is preferably set to be not longer than 50 nm, and more desirably made to roughly coincide with the wavelength band (635 nm through 645 nm) of the red supplementary light beam RL.

As shown in FIG. 4, in the bandpass filter 35, the transmittance for the band between the wavelength λR1 and the wavelength λR2 is as high as no lower than 90%, and the transmittance for the other band is zero or nearly zero. Therefore, the light (the red supplementary light beams RL) from the red laser emitting elements 40a described later is transmitted through the bandpass filter 35.

Here, the red supplementary light beams RL emitted from the respective red laser emitting elements 40a enter the second collimator optical system 41. The second collimator optical system 41 converts the red supplementary light beams RL emitted from the respective red laser emitting elements 40a into parallel light. The second collimator optical system 41 is constituted by, for example, a plurality of collimator lenses 41a arranged in an array. The collimator lenses 41a are disposed so as to correspond respectively to the red laser emitting elements 40a.

The red supplementary light beams RL having passed through the second collimator optical system 41 enter the afocal optical system 42. The afocal optical system 42 is constituted by a convex lens 42a and a concave lens 42b, and reduces the beam diameter of the pencil including the plurality of red supplementary light beams RL.

The pencil which is transmitted through the afocal optical system 42 to thereby be reduced in flux diameter, and includes a plurality of red supplementary light beams RL enters the light collection optical system 43. Due to the light collection optical system 43, the red supplementary light beams RL enter the fluorescence emitting element 27 in a converged state. The light collection optical system 43 is formed of, for example, two lenses 43a, 43b.

The red supplementary light beams RL are transmitted through the bandpass filter 35, and then enter the phosphor 34 from the lower surface 34b of the phosphor 34. The red supplementary light beams RL having entered the phosphor 34 propagate inside the phosphor 34 while being diffused by the scattering substances included in the phosphor 34, and are then emitted from the upper surface 34a. Thus, the red supplementary light beams RL are transmitted through the phosphor 34 to thereby be emitted as red diffused light RL1. In other words, in the present embodiment, the phosphor 34 functions as a diffusion plate with respect to the red supplementary light beams RL.

As shown in FIG. 2, the bandpass filter 35 of the present embodiment has a diffusion layer (a first diffusion layer) 36 disposed at an incident side which the red supplementary light beams RL enter. According to this configuration, the red supplementary light beams RL become arranged to be diffused when being transmitted through the bandpass filter 35. According to the fluorescence emitting element 27 of the present embodiment, it is possible to sufficiently diffuse the red supplementary light beams RL due to the diffusion action by the diffusion layer 36 and the diffusion action by the phosphor 34. Therefore, it is possible to approximate the emission distribution of the red diffused light RL1 emitted from the fluorescence emitting element 27 to the emission distribution of the fluorescence YL.

Further, in the present embodiment, the light collection optical system 43 has the same lens configuration as that of the first pickup optical system 29. Here, the same lens configuration means that the lens shapes are the same, and the number of the lenses is the same. Specifically, the two lenses 43a, 43b constituting the light collection optical system 43 are the same as the two lenses 29a, 29b constituting the first pickup optical system 29, respectively.

According to this configuration, the converging degree of the light in the light collection optical system 43 and the converging degree of the light in the first pickup optical system 29 become equal to each other. Therefore, the incident angle of the red supplementary light beams RL which enter the fluorescence emitting element 27 in the converged state due to the light collection optical system 43, and the incident angle of the red supplementary light beams RL which enter the diffusely reflecting element 30 in the converged state due to the first pickup optical system 29 are nearly equal to each other. The diffusion degree of the diffused light generally depends on the incident angle of the light to the diffusion member. Therefore, the diffusion degree of the red diffused light RL1 emitted from the fluorescence emitting element 27 and the diffusion degree of the blue diffused light BLs1 emitted from the diffusely reflecting element 30 become nearly equal to each other.

The red diffused light RL1 emitted from the fluorescence emitting element 27 is converted by the second pickup optical system 26 into parallel light, and then enters the polarization beam splitter 25.

Since the fluorescence YL is radiated in all directions in the phosphor 34, some of the fluorescence YL is directly emitted from the upper surface 34a of the phosphor 34 without passing through the bandpass filter 35. Further, the rest of the fluorescence YL enters the bandpass filter 35 disposed on the lower surface 34b of the phosphor 34.

The fluorescence YL includes green fluorescence KG and red fluorescence KR. The wavelength band of the red fluorescence KR out of the fluorescence YL includes the wavelength band (635 nm through 645 nm) of the red supplementary light beams RL emitted from the red supplementary light source 40. As described above, the bandpass filter 35 transmits the red supplementary light beams RL. Therefore, the bandpass filter 35 also transmits a red component corresponding to the predetermined wavelength band of the red supplementary light beams RL out of the red fluorescence KR. Here, the red component corresponding to the predetermined wavelength band corresponds to a component in the band between the wavelength $\lambda R1$ and the wavelength $\lambda R2$ shown in FIG. 4. The component having been transmitted through the bandpass filter 35 is blocked by a light blocking member not shown, and is therefore not used as the illumination light WL described later. In other words, although the component having been transmitted through the bandpass filter 35 becomes the light loss, the component is narrow in band, and has a minute proportion to the whole of the fluorescence YL, and therefore, it can be said that the light loss of the red component of the fluorescence YL is sufficiently small from a viewpoint of the whole of the illumination device 2. The loss by the component having been transmitted through the bandpass filter 35 can be compensated by the red supplementary light beams RL emitted from the red supplementary light source 40.

It should be noted that it is desirable to make the band between the wavelength $\lambda R1$ and the wavelength $\lambda R2$ shown in FIG. 4 and the wavelength band of the red supplementary light beams RL completely coincide with each other. By adopting this configuration, the red component which cannot be used as the illumination light can be kept to the minimum.

Further, the fluorescence YL in a different wavelength band from the band between the wavelength $\lambda R1$ and the wavelength $\lambda R2$ is generally reflected by the bandpass filter 35, and is emitted to the outside from the upper surface 34a of the phosphor 34. In such a manner, the fluorescence YL is emitted from the phosphor 34 toward the second pickup optical system 26. The fluorescence YL is picked up by the second pickup optical system 26 to thereby be collimated, and then enters the polarization beam splitter 25.

In the present embodiment, as shown in FIG. 3, the polarization beam splitter 25 has a characteristic of transmitting the fluorescence YL and the red diffused light RL1 irrespective of the polarization state. Therefore, the polarization beam splitter 25 emits the blue diffused light BLs1 diffused by the diffusely reflecting element 30, the red diffused light RL1 having been transmitted through the fluorescence emitting element 27 and the fluorescence YL in one direction (a direction toward the fly-eye integrator 31).

Thus, the polarization beam splitter 25 of the present embodiment combines the blue diffused light BLs1, the red diffused light RL1 and the fluorescence YL with each other to generate the illumination light WL. In the present embodiment, the red diffused light RL1 corresponds to the total flux (100%) of the red supplementary light beams RL emitted from the red supplementary light source 40.

The illumination light WL is emitted toward the fly-eye integrator 31. The fly-eye integrator 31 has a first multi-lens 31a and a second multi-lens 31b. The first multi-lens 31a has a plurality of first small lenses 31am for dividing the illumination light WL into a plurality of partial light beams.

The lens surface (the surface of the first small lenses 31am) of the first multi-lens 31a and the image formation area of each of the light modulation devices 4R, 4G and 4B are conjugated with each other. Therefore, the shape of each of the first small lenses 31am is a roughly similar shape (a rectangular shape) to the shape of each of the image formation areas of the light modulation devices 4R, 4G and 4B. Thus, each of the partial light beams emitted from the first multi-lens 31a efficiently enters each of the image formation areas of the light modulation devices 4R, 4G and 4B.

The second multi-lens 31b has a plurality of second small lenses 31bm corresponding respectively to the first small lenses 31am of the first multi-lens 31a. The second multi-lens 31b forms an image of each of the first small lenses 31am of the first multi-lens 31a in the vicinity of each of the image formation areas of the respective light modulation devices 4R, 4G and 4B in cooperation with the superimposing lens 33.

The illumination light WL having been transmitted through the fly-eye integrator 31 enters the polarization conversion element 32. The polarization conversion element 32 is constituted by polarization split films and wave plates (half-wave plates) arranged in an array. The polarization conversion element 32 converts the polarization direction of the illumination light WL into a predetermined direction. More specifically, the polarization conversion element 32 makes the polarization direction of the illumination light WL correspond to the direction of the transmission axis of the polarization plate (not shown) disposed on the light incident side of each of the light modulation devices 4R, 4G and 4B. Thus, the polarization direction of the red light LR, the green light LG and the blue light LB obtained by splitting the illumination light WL as described above corresponds to the transmission axis direction of the incident side polarization plate of each of the light modulation devices 4R, 4G and 4B. Therefore, the red light LR, the green light LG and the blue light LB are respectively guided to the image formation areas of the light modulation devices 4R, 4G and 4B in good condition without being blocked by the incident side polarization plates, respectively.

The illumination light WL having been transmitted through the polarization conversion element 32 enters the superimposing lens 33. The superimposing lens 33 homogenizes the illuminance distribution due to the illumination light WL in the area to be illuminated in cooperation with the fly-eye integrator 31.

As described above, in the illumination device 2 according to the present embodiment, the red supplementary light beams RL emitted by the red supplementary light source 40 are transmitted through the phosphor 34 due to the bandpass filter 35, and thus, can be used as the illumination light WL. Therefore, by efficiently assisting the red light LR, it is possible to generate the illumination light WL having the optimum white balance.

Further, in the illumination device 2 according to the present embodiment, by adjusting the output of the red supplementary light beams RL emitted from the red supplementary light source 40, it is possible to arbitrarily control the assist amount of the red component (the red light LR) of the illumination light WL. Therefore, it is possible to efficiently generate the red light LR having a desired tint. Therefore, since the shortage of the red component is supplemented by controlling the assist amount, it is possible to obtain the light having the appropriate white balance as the illumination light WL.

Further, in the illumination device 2 according to the present embodiment, since the light loss (the red component corresponding to the predetermined wavelength band of the red supplementary light beams RL) of the fluorescence YL in the bandpass filter 35 is suppressed to a low level, the output of the red supplementary light beams RL necessary when compensating the light loss can be low. Therefore, it is possible to efficiently assist the red component of the illumination light WL.

Further, in the illumination device 2 according to the present embodiment, since it is possible to diffuse the light beams BL from the blue laser emitting elements 21a and the red supplementary light beams RL from the red laser emitting elements 40a with the fluorescence emitting element 27, a dedicated diffusion element becomes unnecessary, and thus, it is possible to achieve reduction in cost.

Further, in the illumination device 2 according to the present embodiment, since the bandpass filter 35 has the diffusion layer 36, it is possible to improve the diffusion characteristic of the red supplementary light beams RL due to the diffusion action of the diffusion layer 36. Therefore, it is possible to approximate the emission distribution of the red diffused light RL1 emitted from the fluorescence emitting element 27 to the emission distribution of the fluorescence YL.

Further, in the illumination device 2 according to the present embodiment, since the light collection optical system 43 and the first pickup optical system 29 have the same lens configuration, it is possible to make the diffusion degree of the red diffused light RL1 and the diffusion degree of the blue diffused light BLs1 nearly equal to each other. Therefore, the illumination light WL obtained by combining the red diffused light RL1 and the blue diffused light BLs1, which have the respective diffusion degrees nearly equal to each other, and have the similar emission distribution to that of the fluorescence YL, and the fluorescence YL with each other becomes light reduced in color unevenness.

Further, according to the illumination device 2 of the present embodiment, by rotating the second wave plate 28a, it is possible to change the ratio between the S-polarized light (the light beams BLs) and the P-polarized light (the light beams BLp) to thereby adjust the ratio between the fluorescence YL and the blue diffused light BLs1. Therefore, even when a variation occurs in the thickness of the phosphor 34 to vary the emission amount of the fluorescence YL, by adjusting the proportion of the light beams BLs used as the excitation light, it is possible to adjust the color balance (the white balance) of the illumination light WL to a desired tint.

Further, in the illumination device 2 according to the present embodiment, the directions in which the excitation light (the light beams BLs) and the red supplementary light beams RL respectively enter the phosphor 34 are set to be opposite to each other. Thus, since it is possible to separate the light path of the excitation light (the light breams BLs) and the light path of the red supplementary light beams RL from each other, an optical component such as a lens is reduced in size compared to the configuration in which the light beams BLs and the red supplementary light beams RL are made to enter the phosphor 34 in the same direction without separating the light paths thereof, and thus, growth in size of the illumination device can be avoided.

Further, according to the projector 1 of the present embodiment, since the illumination device 2 described above is provided, the red light LR is sufficiently supplemented, and therefore, it becomes possible to generate the white light having the optimum white balance. Therefore, it is possible to display images good in quality.

Second Embodiment

Then, an illumination device according to a second embodiment of the present disclosure will be described. The present embodiment and the embodiment described above are difference from each other only in the configuration of the fluorescence emitting element, and are the same in the other configurations. Therefore, in the following description, the configuration of the fluorescence emitting element will mainly be described, the members common to the present embodiment and the embodiment described above will be denoted by the same reference symbols, and the detailed description thereof will be omitted.

Figure 5:
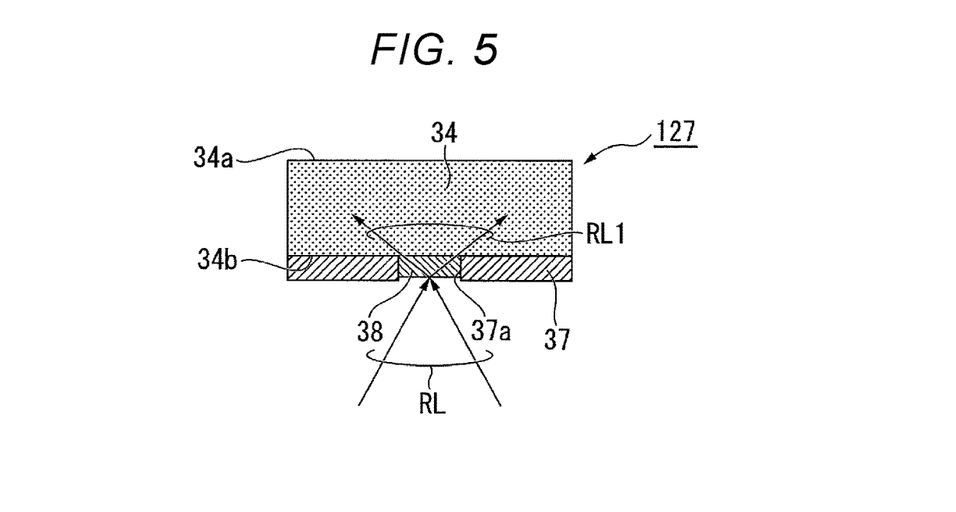
FIG. 5 is a cross-sectional view showing a configuration of a fluorescence emitting element related to the embodiment.

FIG. 5 is a cross-sectional view showing the configuration of the fluorescence emitting element related to the present embodiment. As shown in FIG. 5, the fluorescence emitting element 127 of the present embodiment has the phosphor 34 and a reflecting mirror (a reflecting film) 37. The reflecting mirror 37 has an opening 37a for transmitting the red supplementary light beams RL from the red laser emitting elements 40a.

In the present embodiment, the opening 37a is disposed so as to correspond to a converging position of the red supplementary light beams RL by the light collection optical system 43. An aperture size of the opening 37a is roughly the same as or slightly larger than the converging spot size in the red supplementary light beams RL. Therefore, the red supplementary light beams RL efficiently enter the phosphor 34 via the opening 37a without being blocked by the opening 37a. The red supplementary light beams RL are transmitted through the opening 37a, and then enter the phosphor 34 from the lower surface 34b of the phosphor 34. The red supplementary light beams RL having entered the phosphor 34 propagate inside the phosphor 34 while being dispersed by the scattering substances included in the phosphor 34, and are then emitted from the upper surface 34a. Thus, the red supplementary light beams RL are transmitted through the phosphor 34 to thereby be emitted as red diffused light RL1.

In the present embodiment, the fluorescence emitting element 127 has a diffusion layer (a second diffusion layer) 38 disposed in the opening 37a of the reflecting mirror 37. When passing through the opening 37a, the red supplementary light beams RL are diffused by the diffusion layer 38. According to the fluorescence emitting element 127 of the present embodiment, it is possible to sufficiently diffuse the red supplementary light beams RL due to the diffusion action by the diffusion layer 38 and the diffusion action by the phosphor 34. Therefore, it is possible to approximate the emission distribution of the red diffused light RL1 emitted from the fluorescence emitting element 127 to the emission distribution of the fluorescence YL.

Since the fluorescence YL is radiated in all directions in the phosphor 34, some of the fluorescence YL is directly emitted from the upper surface 34a of the phosphor 34 without passing through the reflecting mirror 37. Further, the rest of the fluorescence YL is reflected by a reflecting film (not shown) disposed inside the phosphor 34 or the reflecting mirror 37 disposed on the lower surface 34b, and is emitted to the outside from the upper surface 34a of the phosphor 34. It should be noted that the component having reached the opening 37a of the reflecting mirror 37 out of the fluorescence YL radiated toward the lower surface 34b is emitted to the outside of the fluorescence emitting element 127, and is therefore not used as the illumination light WL. In other words, the component having passed through the opening 37a becomes the light loss.

In the present embodiment, since the aperture size of the opening 37a is set to be roughly the same as the converging spot size in the red supplementary light beams RL as described above, the proportion of the light loss by the opening 37a to the whole of the fluorescence YL becomes minute. Therefore, from a viewpoint of the whole of the illumination device 2, the light loss of the fluorescence YL is sufficiently small.

According to the fluorescence emitting element 127 of the present embodiment, the red supplementary light beams RL emitted from the red supplementary light source 40 are made to be transmitted through the phosphor 34 via the opening 37a of the reflecting mirror 37, and thus can be used as the illumination light WL. Therefore, by efficiently assisting the red light LR, it is possible to generate the illumination light WL having the optimum white balance.

Further, according to the fluorescence emitting element 127 of the present embodiment, since the fluorescence emitting element 127 can be configured by disposing the reflecting mirror 37 having the opening 37a on the lower surface 34b of the phosphor 34, it is possible to easily manufacture the fluorescence emitting element 127 compared to the fluorescence emitting element 27 using the bandpass filter 35. Therefore, the manufacturing cost can be reduced.

Further, according to the fluorescence emitting element 127 of the present embodiment, since the diffusion layer 38 is disposed in the opening 37a of the reflecting mirror 37, it is possible to improve the diffusion characteristic of the red supplementary light beams RL due to the diffusion action of the diffusion layer 38.

Modified Examples

As the fluorescence emitting element 127 of the present embodiment, there is described a so-called stationary type in which the phosphor to be irradiated with the excitation light does not move, but it is also possible to adopt a so-called rotary type in which the phosphor to be irradiated with the excitation light rotates.

Figure 6:
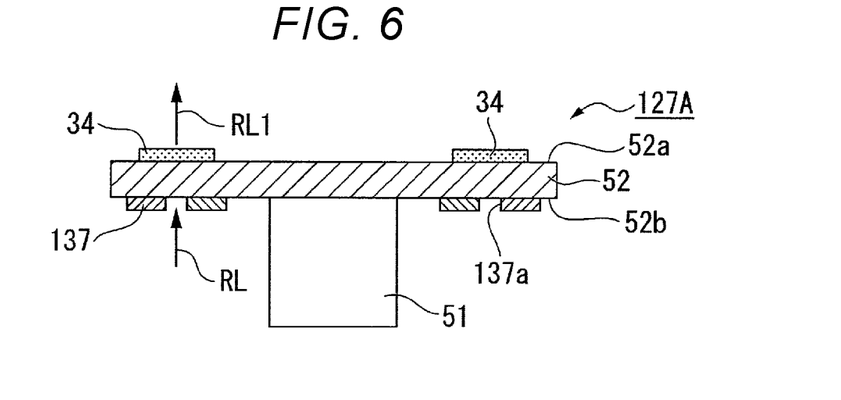
FIG. 6 is a cross-sectional view showing a configuration of a fluorescence emitting element related to a modified example of a second embodiment.
Figure 7:
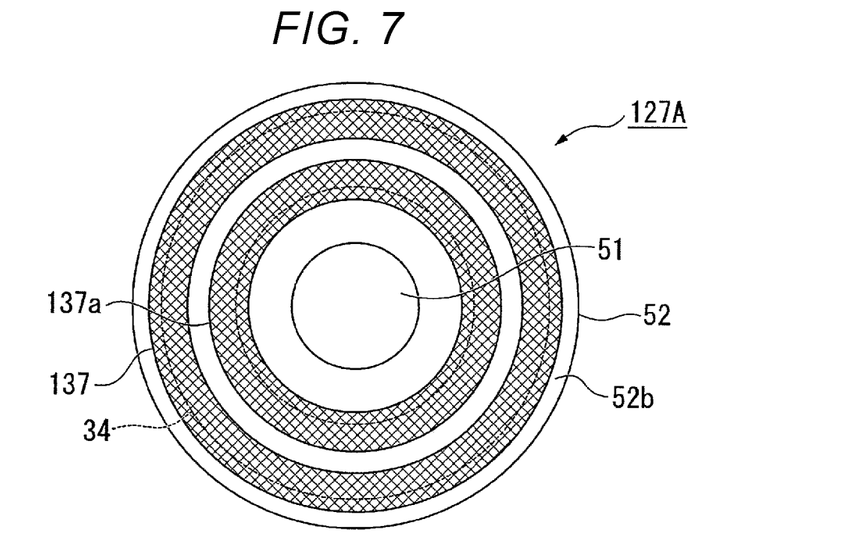
FIG. 7 is a plan view showing a configuration of a fluorescence emitting element related to the modified example of the second embodiment.

FIG. 6 is a cross-sectional view showing a configuration of a fluorescence emitting element related to a modified example of the second embodiment. FIG. 7 is a plan view showing a configuration of the fluorescence emitting element related to the modified example of the second embodiment. It should be noted that FIG. 7 is a plan view of the fluorescence emitting element viewed from a bottom surface side.

As shown in FIG. 6 and FIG. 7, the fluorescence emitting element 127A of the present modified example has a substrate 52 having a light transmissive property and shaped like a disk rotated by a motor 51, a phosphor 34 disposed to have a ring-like shape on an upper surface 52a of the substrate 52, and a reflecting mirror (a reflecting film) 137 disposed on a lower surface 52b of the substrate 52.

The reflecting mirror 137 has a ring-like shape similarly to the phosphor 34, and is larger in outer shape than the phosphor 34. Further, the reflecting mirror 137 has an opening 137a for transmitting the red supplementary light beams RL from the red laser emitting elements 40a.

The opening 137a is disposed so as to correspond to a converging position of the red supplementary light beams RL by the light collection optical system 43. Specifically, the opening 137a is a hole shaped like a ring disposed at the center in the radial direction of the phosphor 34. An aperture width in the radial direction in the opening 137a is roughly the same as or slightly larger than the converging spot size in the red supplementary light beams RL. Based on this configuration, the red supplementary light beam RL converged on a predetermined position of the fluorescence emitting element 127A can efficiently enter the phosphor 34 via the opening 137a even when the reflecting mirror 137 moves in a circumferential direction due to the rotation of the substrate 52.

Therefore, also in the fluorescence emitting element 127A of the present modified example, the red supplementary light beams RL emitted from the red supplementary light source 40 are made to be transmitted through the phosphor 34 via the opening 137a of the reflecting mirror 137, and thus can be used as the illumination light WL. Therefore, by efficiently assisting the red light LR, it is possible to generate the illumination light WL having the optimum white balance.

It should be noted that the present disclosure is not limited to the contents of the embodiments described above, but can arbitrarily be modified within the scope or the spirit of the present disclosure.

For example, in the embodiments described above, it is also possible to reverse the positions of the diffusely reflecting element 30 and the fluorescence emitting element 27 with respect to the polarization beam splitter 25. Specifically, it is possible to adopt a configuration in which the light beams BLs (the blue second polarization component) as S-polarized light reflected by the polarization beam splitter 25 are made to enter the diffusely reflecting element 30, and the light beams BLp (the blue first polarization component) as P-polarized light transmitted through the polarization beam splitter 25 are made to enter the fluorescence emitting element 27 as the excitation light. In this case, the red laser emitting elements 40a disposed on the light axis ax1 each emit the light having the same polarization direction as the S-polarized light (the light beam BLs) of the light beam BL obtained by performing the polarization split in the polarization beam splitter 25 as the red supplementary light beam RL toward the fluorescence emitting element 27.

Further, in the embodiments described above, it is also possible to dispose a homogenizer optical system between the red supplementary light source 40 and the light collection optical system 43. According to this configuration, it is possible to improve the homogeneity of the illuminance distribution of the red supplementary light beams RL on the diffusely reflecting element 30.

Further, although in the embodiments described above, there is described the example of installing the illumination device according to the present disclosure in the projector, this is not a limitation. The illumination device according to the present disclosure can also be applied to lighting equipment, a headlight of a vehicle, and so on.

What is claimed is:

1. An illumination device comprising:
   a blue laser emitting element;
   a red laser emitting element configured to emit light in a predetermined wavelength band;
   a diffusely reflecting element configured to diffuse and reflect a part of light from the blue laser emitting element;
   a phosphor excited by a part of the light from the blue laser emitting element to emit fluorescence;
   a bandpass filter provided to a second surface of the phosphor opposite to a first surface of the phosphor which the light from the blue laser emitting element enters, and configured to transmit the light from the red laser emitting element;
   a polarization splitting/combining element having a polarization split function with respect to the light from the blue laser emitting element; and
   a first wave plate disposed between the polarization splitting/combining element and the diffusely reflecting element, wherein
   the polarization splitting/combining element
      guides a blue first polarization component obtained by performing polarization split on the light from the blue laser emitting element to the diffusely reflecting element, and guides a blue second polarization component obtained by performing polarization split on the light from the blue laser emitting element to the phosphor, and
      combines the fluorescence emitted from the phosphor, the light from the red laser emitting element entering the second surface of the phosphor and then emitted from the first surface of the phosphor, and blue diffused light which is the blue first polarization component converted via the diffusely reflecting element and the first wave plate into a different polarization state with each other to generate illumination light.

2. The illumination device according to claim 1, wherein the bandpass filter has a first diffusion layer disposed at a plane-of-incidence side which the light from the red laser emitting element enters.

3. A projector comprising:
   the illumination device according to claim 2;
   a light modulation device configured to modulate the light from the illumination device in accordance with image information to thereby form image light; and
   a projection optical system configured to project the image light.

4. The illumination device according to claim 1, further comprising:
   a pickup optical system disposed between the diffusely reflecting element and the polarization splitting/combining element; and
   a light collection optical system disposed between the red laser emitting element and the phosphor, wherein
   the pickup optical system and the light collection optical system have a same lens configuration.

5. A projector comprising:
   the illumination device according to claim 4;
   a light modulation device configured to modulate the light from the illumination device in accordance with image information to thereby form image light; and
   a projection optical system configured to project the image light.

6. The illumination device according to claim 1, wherein the phosphor diffuses the light from the red laser emitting element.

7. A projector comprising:
   the illumination device according to claim 6;
   a light modulation device configured to modulate the light from the illumination device in accordance with image information to thereby form image light; and
   a projection optical system configured to project the image light.

8. The illumination device according to claim 1, further comprising:
   a second wave plate rotatably disposed between the polarization splitting/combining element and the blue laser emitting element.

9. A projector comprising:
   the illumination device according to claim 8;
   a light modulation device configured to modulate the light from the illumination device in accordance with image information to thereby form image light; and
   a projection optical system configured to project the image light.

10. A projector comprising:
    the illumination device according to claim 1;
    a light modulation device configured to modulate the light from the illumination device in accordance with image information to thereby form image light; and
    a projection optical system configured to project the image light.

11. An illumination device comprising:
    a blue laser emitting element;
    a red laser emitting element configured to emit light in a predetermined wavelength band;
    a diffusely reflecting element configured to diffuse and reflect a part of light from the blue laser emitting element;
    a phosphor excited by a part of the light from the blue laser emitting element to emit fluorescence;
    a reflecting film provided to a second surface of the phosphor opposite to a first surface of the phosphor which the light from the blue laser emitting element enters, and having an opening configured to transmit the light from the red laser emitting element;
    a polarization splitting/combining element having a polarization split function with respect to the light from the blue laser emitting element; and
    a first wave plate disposed between the polarization splitting/combining element and the diffusely reflecting element, wherein
    the polarization splitting/combining element
       guides a blue first polarization component obtained by performing polarization split on the light from the blue laser emitting element to the diffusely reflecting element, and guides a blue second polarization component obtained by performing polarization split on the light from the blue laser emitting element to the phosphor, and
       combines the fluorescence emitted from the phosphor, red diffused light which is the light from the red laser emitting element entering the second surface of the phosphor via the opening and then emitted from the first surface of the phosphor to thereby be diffused, and blue diffused light which is the blue first polarization component converted via the diffusely reflecting element and the first wave plate into a different polarization state with each other to generate illumination light.

12. The illumination device according to claim 11, further comprising:
a second diffusion layer disposed in the opening of the reflecting film.

13. A projector comprising:
the illumination device according to claim 12;
a light modulation device configured to modulate the light from the illumination device in accordance with image information to thereby form image light; and
a projection optical system configured to project the image light.

14. The illumination device according to claim 11, further comprising:
a pickup optical system disposed between the diffusely reflecting element and the polarization splitting/combining element; and
a light collection optical system disposed between the red laser emitting element and the phosphor, wherein
the pickup optical system and the light collection optical system have a same lens configuration.

15. A projector comprising:
the illumination device according to claim 14;
a light modulation device configured to modulate the light from the illumination device in accordance with image information to thereby form image light; and
a projection optical system configured to project the image light.

16. The illumination device according to claim 11, wherein
the phosphor diffuses the light from the red laser emitting element.

17. A projector comprising:
the illumination device according to claim 16;
a light modulation device configured to modulate the light from the illumination device in accordance with image information to thereby form image light; and
a projection optical system configured to project the image light.

18. The illumination device according to claim 11, further comprising:
a second wave plate rotatably disposed between the polarization splitting/combining element and the blue laser emitting element.

19. A projector comprising:
the illumination device according to claim 18;
a light modulation device configured to modulate the light from the illumination device in accordance with image information to thereby form image light; and
a projection optical system configured to project the image light.

20. A projector comprising:
the illumination device according to claim 11;
a light modulation device configured to modulate the light from the illumination device in accordance with image information to thereby form image light; and
a projection optical system configured to project the image light.

* * * * *